3,183,272
BORON COMPOUNDS AND METHOD FOR
MAKING THE SAME
Joseph J. Dvorak, Rockaway, Daniel Grafstein, Morristown, and Marvin M. Fein, Westfield, N.J., assignors to Thiokol Chemical Corporation, Bristol, Pa., a corporation of Delaware
No Drawing. Filed Apr. 25, 1961, Ser. No. 106,428
7 Claims. (Cl. 260—606.5)

This invention relates to methods of preparing carborane by oxidative methods.

Heretofore, carborane,

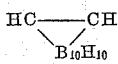

has been prepared by reaction of acetylene with a bis(nitrilo)decaborane, as disclosed in the copending application of Bobinski, Fein, and Mayes, Serial No. 59,460, filed September 29, 1960. The procedure reacts acetylene with a bis(nitrilo)decaborane at superatmospheric pressures in an autoclave. However, the yields obtained in the process are low, and the reaction does not lend itself to a convenient, economical production of carborane.

In fuller explanation of the prior art process, it can be mentioned that the preparation of decaborane, $B_{10}H_{14}$, is known in the art and involves heating lower boron hydrides, e.g., heating $B_4H_{10}$ to 90°–95° C. for five hours. The preparation of bis(nitrilo)decaboranes is described in the copending application of Murray S. Cohen et al., Serial No. 690,407, filed October 15, 1957. As therein taught, bis(nitrilo)decaboranes are suitably prepared by reacting 0.01 to 14 moles of a nitrile of an unsubstituted saturated monocarboxylic acid per mole of decaborane at a temperature between 0° C. and 180° C.

Alternatively, carborane has been prepared in the prior art by passing gaseous acetylene through an ether solution of decaborane in the presence of diethyl sulfide. This process has the disadvantage of producing numerous impurities which are difficult to separate from the product, and which interfere in its reactions.

It has now been found that carborane can be produced in high yield by alkaline oxidation of 11,12-bis(hydroxymethyl)carborane or its lower alkanoic acid esters. Taking alkaline permanganate as an illustrative oxidizing agent, the oxidations proceed as follows, for example:

$4KOH + 3HOCH_2\theta CH_2OH + 8KMnO_4 \rightarrow$
$3H\theta H + 8MnO_2 + 6K_2CO_3 + 8H_2O$ and

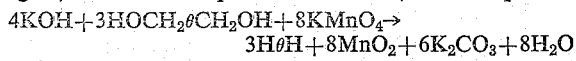

$3H\theta H + 8MnO_2 + 6KO\overset{O}{\underset{\|}{C}}CH_3 + 6K_2CO_3 + 8H_2O$ where $\theta =$

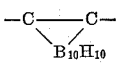

11,12-bis(acetoxymethyl)carborane,

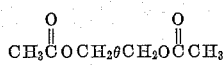

or other lower alkanoic acid diesters of 11,12-bis(hydroxymethyl)carborane, are conveniently prepared by reacting a bis(nitrilo)decaborane with the acetate, or other lower alkanoic acid ester, of 2-butyne-1,4-diol, as disclosed in the copending application of Green et al., Ser. No. 844,821, filed October 2, 1959.

11,12-bis(hydroxymethyl)carborane, $HOCH_2\theta CH_2OH$ is most easily prepared by transesterification with methanol, or by acid or alkali hydrolysis, of a diester of the carborane diol. Said carborane diesters are prepared, as described above, from esters of 2-butyne-1,4-diol with lower saturated aliphatic acids having 1–5 carbon atoms.

The oxidation of either of these materials to carborane is carried out in alkaline solution, that is a solution having a pH greater than 7. As oxidizing agents are suitable such water-soluble inorganic oxidizing agents as hydrogen peroxide, alkali metal dichromates, and, particularly, alkali metal permanganates, e.g. sodium and potassium permanganates. The latter reagent is particularly suitable, and oxidizes the derivatives at room temperature in a clean, easily controlled reaction. The oxidizing agent and boron compound can be combined in any suitable manner. When using colored permanganates, it is convenient to add the oxidizing agent slowly, e.g., over a ½ to 15 hour period, observing loss of color and avoiding an excess of oxidizing agent. Oxidation of 11,12-bis(hydroxymethyl)carborane, in general, proceeds more rapidly than oxidation of its diester derivatives.

A more complete understanding of the invention can be had by reference to the following specific examples, given by way of illustration.

EXAMPLE 1

Preparation of 11,12-bis(acetoxymethyl)carborane

Bis(acetonitrilo)decaborane was obtained by refluxing 10 moles of acetonitrile with one mole of decaborane for up to 24 hours. After cooling, white crystals of bis(acetonitrilo)decaborane were filtered therefrom.

5.9 grams (0.035 mole) of 1,4-diacetoxy-2-butyne were condensed with 5.9 grams (0.029 mole) of the bis(acetonitrilo)decaborane by refluxing in 50 ml. of toluene. After removing the solvent under reduced pressure, 8 grams of an orange oil containing 11,12-bis(acetoxymethyl)carborane (a white solid when pure) were obtained. The impurities present in the oil were hydrolyzed by heating with 5 percent sodium ethoxide for 15 minutes, followed by a neutralization with hydrochloric acid. Bis(acetoxymethyl)carborane was separated from the aqueous components.

EXAMPLE 2

Preparation of 11,12-bis(hydroxymethyl)carborane 4 grams of the compound prepared in Example 1 were dissolved in 25 ml. of methanol and refluxed one hour with 15 ml. of 25 percent aqueous sodium hydroxide. After extraction of the product with ether, the ethereal solution was washed with water, dried, and concentrated under vacuum, leaving a white solid, bis(hydroxymethyl)carborane.

Another portion of the starting material was hydrolyzed using aqueous methanolic hydrogen chloride. The infrared spectra of the materials obtained were almost identical, although that obtained by acid hydrolysis was somewhat less pure. The materials were recrystallized from water containing a little methanol, and had a hydroxy value of 16 percent compared with a calculated value of 16.4 percent.

EXAMPLE 3

Oxidation of 11,12-bis(acetoxymethyl)carborane
to carborane 11.60 grams (0.04 mol) of 11,12-bis(acetoxymethyl)carborane were stirred with 200 ml. of 20 percent aqueous KOH, keeping the temperature at 25° C. 16.90 grams (0.107 mol) of finely powdered $KMnO_4$ were slowly added to the mixture over a period of 8–12 hours at a rate such that no appreciable quantity of unreacted $KMnO_4$ was present at any time. After addition was complete, the reaction mixture was cooled and acidified with $H_2SO_4$.

Considerable foaming may occur during the oxidation, and 2–3 ml. portions of ether can be added from time to time to break the foam.

After reaction, the mixture was extracted with benzene in fractions totalling 250 ml. The benzene extracts were combined and dried. On removal of the benzene by evaporation, carborane was obtained as a residue. The minimum yield was 4.19 grams, or 73 percent of theory.

EXAMPLE 4

*Oxidation of 11,12-bis(hydroxymethyl)carborane to carborane*

10.30 grams (0.05 mol) of bis(hydroxymethyl)carborane were mixed with 100 ml. of 20 percent aqueous KOH, keeping the temperature of the mixture at about 20° C. 21.49 grams (0.136 mol) of finely powdered $KMnO_4$ were added slowly over a period of 1½–2 hours at such a rate that no appreciable quantity of unreacted $KMnO_4$ was present in the mixture at any time. Ether, in 2–3 ml. portions, may be added to reduce foaming if desired. After addition of the oxidizing agent was complete, the reaction mixture was cooled and acidified, and then extracted with a total of 375 ml. of benzene. The benzene extracts were combined, dried, and evaporated to give a minimum carborane yield of 4.18 grams (58 percent of theory).

Carborane is a high melting solid which is useful, because of the high energy released when it is burned, as an additive in solid propellant compositions for rockets, and as an intermediate to carborane derivatives themselves useful in compounding solid propellants. Solid propellants are known to the art, and may for example comprise 10 to 35 parts by weight of boron compound and from 65–90 parts by weight of a conventional solid oxidizer, such as ammonium, potassium, or sodium perchlorates, ammonium nitrate, or the like. The components are finely divided and intimately admixed with one another.

The propellant composition may also contain 5–10 percent by weight, based on the weight of boron compound and oxidizer, of a natural or synthetic resin. For example, the solids can be combined with a solution of partially condensed phenol-formaldehyde or urea-formaldehyde resin, mixed with removal of solvent, shaped, as by extrusion, and then cured by heating at moderate temperatures.

Although specific embodiments have been shown and described, it is understood that they are illustrative and are not to be construed as limiting on the scope and spirit of the invention.

What is claimed is:

1. The method of making carborane which comprises oxidizing a member of the group consisting of bis(hydroxymethyl)carborane and its lower alkanoic acid diesters under alkaline conditions with an oxidizing agent selected from the group consisting of hydrogen peroxide, and water-soluble dichromates and permanganates.

2. The method as in claim 1 wherein bis(acetoxymethyl)carborane is oxidized.

3. The method as in claim 1 wherein bis(hydroxymethyl)carborane is oxidized.

4. The method of making carborane which comprises oxidizing a member of the group consisting of bis(hydroxymethyl)carborane and its lower alkanoic acid diesters with permanganate under alkaline conditions.

5. The method of making carborane which comprises contacting an alkali metal permanganate with a member selected from the group consisting of bis(hydroxymethyl)carborane and its lower alkanoic acid diesters, whereby carborane is produced by oxidation.

6. The method as in claim 5 wherein bis(hydroxymethyl)carborane is oxidized.

7. The method as in claim 5 wherein bis(acetoxymethyl)carborane is oxidized.

No references cited.

TOBIAS E. LEVOW, *Primary Examiner.*

LEON D. ROSDOL, CARL D. QUARFORTH,
*Examiners.*